Feb. 13, 1934.  A. R. KUZELEWSKI  1,947,051
HYDRAULIC TRANSMISSION
Filed April 16, 1932  2 Sheets-Sheet 1
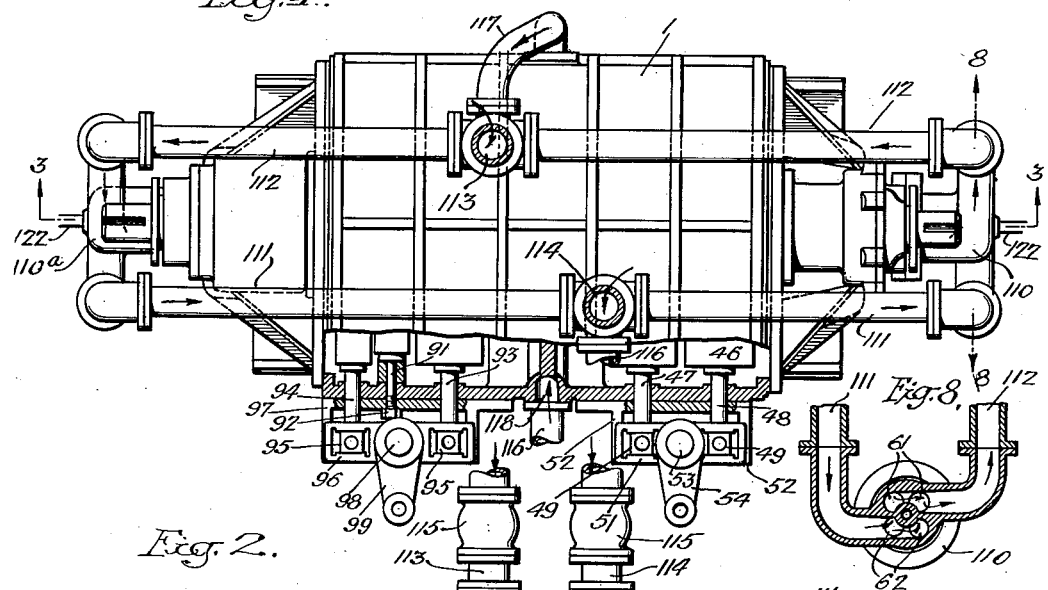
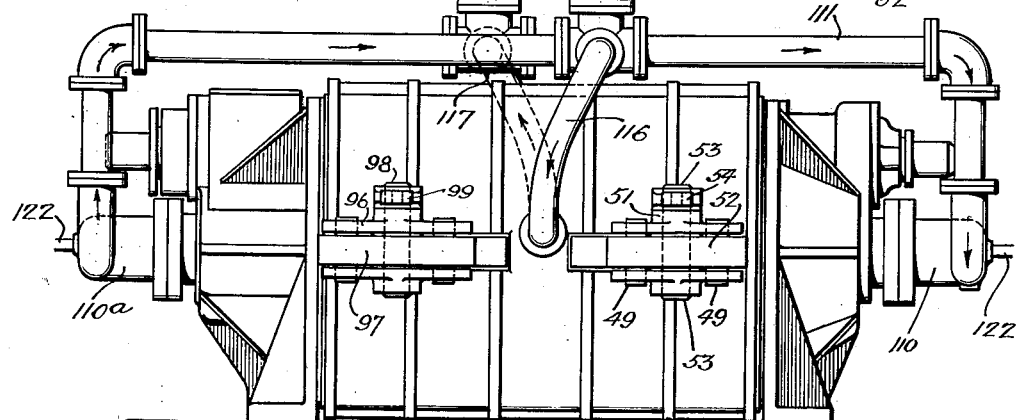
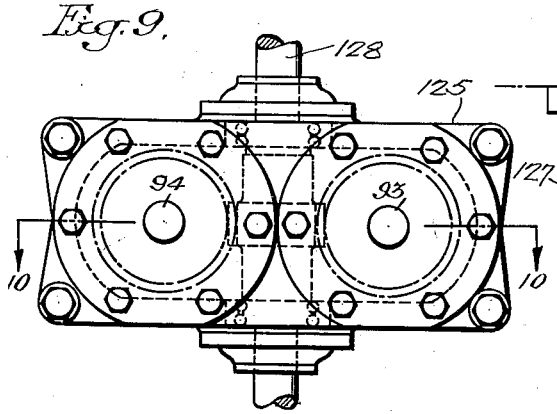
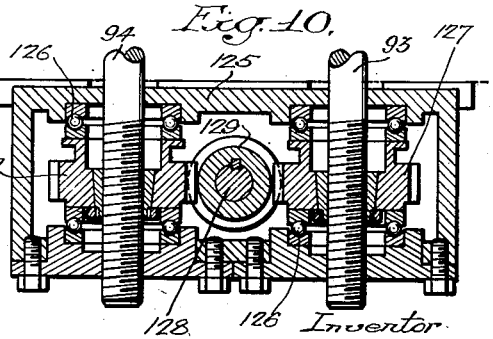
Inventor
Albert R. Kuzelewski
by his Attorneys
Howson & Howson

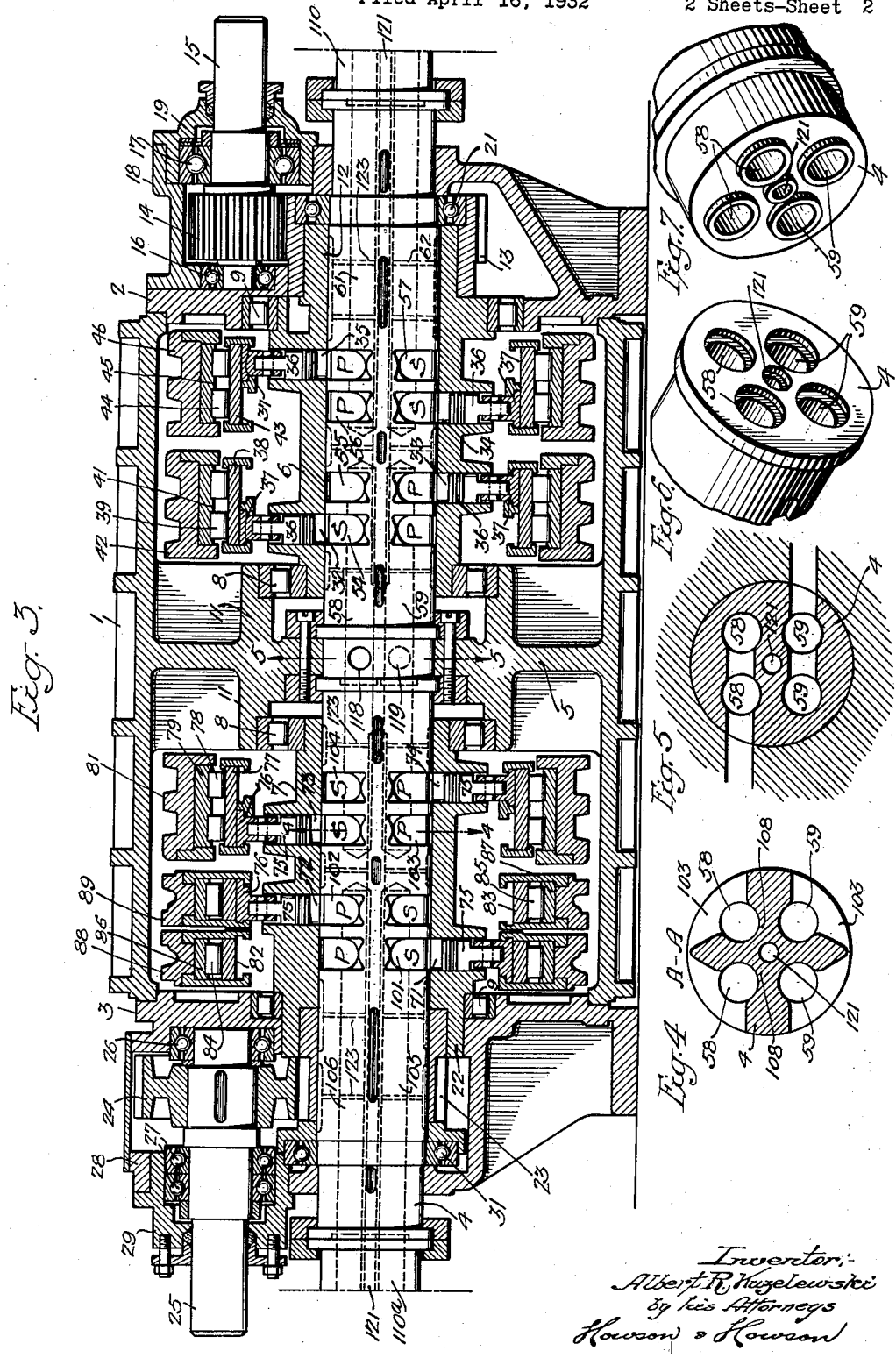

Patented Feb. 13, 1934

1,947,051

UNITED STATES PATENT OFFICE 1,947,051

HYDRAULIC TRANSMISSION

Albert R. Kuzelewski, Philadelphia, Pa., assignor to American Engineering Company, Philadelphia, Pa., a corporation of Pennsylvania Application April 16, 1932. Serial No. 605,737

9 Claims. (Cl. 60—53)

This invention relates to improvements in hydraulic transmissions of the general character disclosed in U. S. Patent No. 1,152,729.

A principal object of the invention is to provide a transmission unit of the stated character providing for wide variations in speed and torque and affording a highly flexible control for these factors. Toward this general end, my invention contemplates the provision of a hydraulic pump and motor unit employing multi-stage construction both in the motor and pump sub-units, together with novel means of controlling said stages to afford the aforesaid selective variations in speed and torque.

A still more specific object of the invention is to provide a transmission of the stated character which shall be particularly well suited to the requirements of mooring apparatus and more particularly to mooring dirigible aircraft.

The invention further resides in certain structural and mechanical details and arrangements of parts as hereinafter set forth and illustrated in the attached drawings, in which:

Figure 1 is a plan and partial sectional view of a transmission unit made in accordance with my invention;

Fig. 2 is a side elevational view of said unit;

Fig. 3 is a section on the line 3—3, Fig. 1;

Figs. 4 and 5 are fragmentary sectional views on the lines 4—4 and 5—5, Fig. 3;

Figs. 6 and 7 are, respectively, fragmentary perspective views illustrating details of the mechanism;

Fig. 8 is a section on the line 8—8, Fig. 1;

Fig. 9 is a fragmentary elevational view illustrating a modification of the mechanism shown in the preceding figures, and Fig. 10 is a section on the line 10—10, Fig. 9.

With reference to the drawings, a transmission unit made in accordance with my invention comprises a substantially rectangular casing 1, this casing having in the present instance end plates 2 and 3 in which are supported a cylindrical valve member 4 which extends longitudinally of the housing and is supported intermediate its ends in a transverse partition 5 in the casing. The valve member 4 is immobilized in the housing by suitable means. Mounted for rotation in the housing about the cylindrical valve member 4 at opposite sides of the partition 5 are cylinder bodies 6 and 7, each of these bodies neatly fitting the valve member and being provided with bearings 8 and 9, the bearings 8 being supported in flanges 11, 11 of the partition 5, and the bearings 9 being supported respectively in the cover plates 2 and 3. The cylinder body 6 has an extension 12 which carries a gear 13, this gear meshing with a pinion 14 on a shaft 15 journaled on bearings 16 and 17 in a sub-casing 18 mounted on the end plate 2, the shaft 15 projecting through the end plate 19 of the sub-casing 18 to the exterior of the housing. A bearing 21 is provided in the casing for the outer end of the gear 13. A corresponding extension 22 on the cylinder body 7 has suitably secured thereto a gear 23 which meshes with a pinion 24 on a shaft 25 projecting from the opposite end of the housing, this shaft being journaled on bearings 26 and 27 in a sub-casing 28 mounted on the end plate 3, the shaft projecting through the end plate 29 of the sub-casing 28 to the exterior of the housing. A bearing 31 is provided for the outer end of the gear 23.

The cylinder body 6 has formed therein four radially arranged series of cylinders 32, 33, 34 and 35, in which operate pistons 36. The outer end of each piston is pivotally connected with a slipper 37, the slippers of the pistons 36 of the series of cylinders 32 and 33 being slidably secured against the inner face of a ring 38 which constitutes the inner race of a roller bearing 39, the outer race 41 of which is secured within a guide block 42 adjustably mounted in the housing. The slippers 37 of the pistons 36 of the series of cylinders 34 and 35 are similarly slidably secured against the inner face of a ring 43 which constitutes the inner race of a roller bearing 44, the outer race 45 of which is mounted in a second guide block 46 also adjustable in the housing. The blocks 42 and 46 are provided respectively with rods 47 and 48 which extend through the side of the casing 1, see Fig. 1, the outer end of each of these rods carrying pivotally secured thereto a cross head 49 slidably positioned in transverse guideways at the opposite ends of a yoke 51, this yoke being supported in a bracket 52 extending from the side of the casing and said yoke being secured to a shaft 53 having at its upper end a lever 54 by means of which the shaft may be oscillated. The arrangement is such that rotary movement of the shaft effects a longitudinal movement of the rods 47 and 48 in opposite directions and corresponding adjustments of the guide blocks 42 and 46. In the positions in which the guide blocks 42 and 46 are shown in Fig. 1, the rings 38 and 43 are both concentric with the cylinder body 6, so that rotation of the said body through the medium of the shaft 15, pinion 14, and gear 13 results in no reciprocatory movement of the pistons 36. Adjustment of the guide blocks 42 and 46 in either direction from this neutral position moves the rings 38 and 43 into positions eccentric to the cylinder body 6, with the result that rotation of the latter effects a reciprocation of the pistons, the stroke depending upon the degree of eccentricity of the said rings.

The valve member 4 is provided toward one end with four sets of ports 54, 55, 56 and 57 positioned respectively to register with the inner ends of the cylinders of the series 32, 33, 34 and 35. Each of the sets of ports is constituted by two ports arranged at diametrically opposite sides of the valve member 4, these two ports being so arranged that the pistons 36 of the associated cylinders when reciprocated as previously described create a suction on one port and pressure on the opposite port. The correspondingly positioned ports of the sets 54 and 55 respectively communicate with passages 58 and 59 in the valve member 4, these passages extending longitudinally in the said valve body and terminating at one end at or adjacent the ports 55. The correspondingly positioned ports of the sets 56 and 57 communicate respectively with similar passages 61 and 62 which extend longitudinally of the valve member from the ports 56 to the adjacent terminal end of the said valve.

The cylinder body 7 has formed therein four radially arranged series of cylinders 71, 72, 73 and 74 in which operate pistons 75. The outer end of each piston is pivotally connected with a slipper 76, the slippers of the pistons of the two series of cylinders 73 and 74 being slidably secured against the inner face of a ring 77 which constitutes the inner race of a roller bearing 78, the outer race 79 of which is secured within a guide block 81 adjustably mounted in the housing. The slippers 76 of the pistons 75 of the series of cylinders 71 and 72 are similarly slidably secured against the inner faces of rings 82 and 83 which respectively constitute the inner races of roller bearings 84 and 85, the outer races 86 and 87 of which are mounted respectively in guide blocks 88 and 89. While these guide blocks are also adjustably mounted in the casing, the block 89 is adapted to be fixed in a given position of adjustment through the medium of a threaded rod 91 and nut 92, see Fig. 1. The blocks 81 and 88 are provided respectively with rods 93 and 94 which extend through the side of the casing 1, see also Fig. 1, the outer end of each of these rods carrying pivotally secured thereto a cross head 95 slidably positioned in transverse guideways at opposite ends of a yoke 96, this yoke being supported in a bracket 97 extending from the side of the casing, and said yoke being secured to a shaft 98 having at its upper end a lever 99 by means of which the shaft may be oscillated. The arrangement is such that rotary movement of the shaft effects a longitudinal movement of the rods 93 and 94 in opposite directions and corresponding adjustments of the guide blocks 81 and 88. In the positions in which the guide blocks 81 and 88 are shown in Fig. 1, the rings 77 and 82 are both concentric with the cylinder body 7, so that fluid pressure applied to the inner ends of the cylinders 71, 73 and 74 exerts through the pistons a direct radial thrust upon the rings 77 and 82, and there is no tendency to cause rotation of the cylinder body 7. Adjustment of the guide blocks 81 and 88 in either direction from this neutral position moves the rings 77 and 82 into positions eccentric to the cylinder body 7, with the result that fluid pressure exerted behind the pistons 75 of the cylinders 71, 73 and 74 effects a rotation of the cylinder body 7, and through the gear 23 and pinion 24 of the shaft 25. The guide block 89 being fixed in a position wherein the ring 83 is eccentric to the cylinder body 7, fluid pressure applied behind the pistons 75 in the cylinders 72 continuously tends to effect a rotation of the cylinder body 7, and consequently of the shaft 25.

The valve member 4 is provided with four sets of ports 101, 102, 103 and 104 positioned respectively to register with the inner ends of the cylinders of the series 71, 72, 73 and 74. Each of the sets of ports is constituted by two ports arranged at diametrically opposite sides of the valve member 4. The correspondingly positioned ports of the sets 101 and 102 respectively communicate with passages 105 and 106 in the valve member 4, these passages extending longitudinally in the said valve body from the ports 102 to the adjacent terminal end of the valve. Correspondingly positioned ports of the sets 103 and 104 respectively communicate with the passages 59 and 58, which as previously set forth also communicate with the ports of the sets 54 and 55.

Referring to Figs. 1, 2 and 8, the passages 61 are connected through fittings 110, 110a and pipe 112 with the passages 106; while the passages 62 are similarly connected through a pipe 111 with the passages 105, and both the pipes 112 and 111 are connected through leads, 113 and 114 respectively, with a make-up tank (not shown) constituting a source of fluid supply for the system. Each of the leads 113 and 114 is provided with a check valve 115 permitting flow from the said tank to the pipes 111, 112 but preventing flow in the opposite direction. The passages 58 and 59 are respectively connected to the pipes 111 and 112 through pipes 116, 117 and ports 118, 119 formed in the casing and in the valve member 4.

In the present instance, the valve member 4 is formed in two sections clamped together at the center of the casing, the meeting ends of the sections being shown in Figs. 6 and 7. From the outer end of each section a passage 121 extends inwardly between the passages 61, 62 and 105, 106, the passages 121 continuing through the fittings 110, 110a and being connected through pipes 122 with a source of lubricant. Ducts 123 extend from the passages 121 to the outer surface of the valve member, as shown in Fig. 3.

The operation of the mechanism is as follows: The cylinder body 6 and the associated mechanism constitute a pump unit driven through the shaft 15, while the cylinder body 7 and the associated elements constitute a fluid motor unit adapted for actuation by the pump to drive the shaft 25. As previously set forth, the guide blocks 42 and 46 in the position shown in Fig. 1 are in the neutral position wherein the rings 38 and 43 are concentric with the cylinder body 6. Under these circumstances, rotation of the cylinder body through the driving shaft 15 results in no movement of the pistons 36 and no pumping action occurs. Pumping action is initiated by adjustment of the blocks 42 and 46 from the neutral position through the medium of the lever 54, as previously set forth. Assuming that the adjustment of the block is such that the pistons 36 of the cylinders 32 and 33 are moving inwardly when the said cylinders are in communication with the lower ports of the series 54 and 55, see Fig. 3, it follows that these pistons are moving outwardly when the cylinders are in communication with the upper ports of said series, and as a consequence fluid withdrawn from the last-named ports and from the passages 58 with which said ports communicate is forced under pressure through the lower ports of the two sets into the passage 59. Since the adjustment of the guide block 46 through the lever 54 is in an opposite direction to the adjustment of the guide block 42, fluid will be withdrawn from the passages 62 through the lower ports of the sets 56 and 57 and will be forced under pressure through the upper ports of said sets into the passage 61. Fluid pressure is thus applied to the lower ports of the sets 103 and 104 of the motor unit which are in communication with the passages 59, and suction is applied to the upper ports of these sets which communicate with the passage 58. Similarly fluid pressure is applied to the upper ports of the sets 101 and 102 communicating with the passage 106, which latter as previously described is connected to the passage 61; and suction is applied to the lower ports of the last-named sets through the passage 105 communicating with the passage 62. If as illustrated the guide blocks 81 and 88 are in the neutral position wherein the rings 77 and 82 are concentric with the cylinder body 7, the pressure applied to the cylinders 71, 73 and 74 through the passages 59 and 106 is not effective to actuate the cylinder body 7. The guide block 89, however, is fixed in a position in which the guide ring 83 is eccentric to the cylinder body 7, and pressure applied to the cylinders 72 through the passage 106 is effective to cause rotation of the cylinder body. Since the passages 59 and 61 are both connected through the pipes 112 and 117 with the passage 106, it will be apparent that the entire output of the pump unit is applied to the cylinders 72. High speed operation of the cylinder body 7 and of the driven shaft 25 is thus effected. If now lower speeds and heavier torques are required, the guide blocks 81 and 88 may be adjusted from the neutral positions into positions of eccentricity with respect to the axis of the cylinder body 7, with the result that the pressure in the passages 59 and 106 is effective to actuate the pistons 75 of the cylinders 71, 73 and 74.

Reverse movement of the shaft 25 may be effected by adjusting the guide blocks 42 and 46 into the opposite positions of eccentricity with respect to the cylinder body 6, this resulting in pressure being applied to the passages 58 and 62 and suction to the passages 59 and 61. Assuming that the guide blocks 88 and 81 of the motor unit occupy a neutral position, this pressure is transmitted through the pipes 116 and 111 to the passage 105 and to the lower ports of the set 102, suction being applied to the upper ports of this set through the pipes 112 and 117. Transmission at lower speeds and higher torques may be effected by adjustment of the blocks 88 and 81 from the neutral position, as previously set forth.

The mechanism described above has many desirable characteristics. The operation is made extremely flexible by ability to adjust the stroke of the pump unit as well as the strokes of the pistons 75 of the cylinders 71, 73 and 74 of the motor unit. A high range of speed and torque is thus afforded. It will be noted further that the arrangement provides for a substantial balance of pressures at opposite sides of the valve both in the pump and motor units.

In Figs. 9 and 10, I have illustrated a modification of the mechanism for actuating the guide blocks. In this instance, the actuating rods 93 and 94 are shown threaded at their projecting ends, these threaded extremities projecting into a housing 125 secured to the casing 1. Within the housing are journaled on bearings 126 a pair of nuts in the form of worm wheels 127 which respectively engage the threads of the rods 93 and 94. Also journaled in the housing is a worm shaft 128 which carries a worm 129 engaging at opposite sides the worm wheels 127. Rotation of the shaft 128 by suitable means (not shown) results through the worm 129 in an opposite rotation of the worm wheels 127, 127, which in turn effects a simultaneous longitudinal movement in opposite directions of the rods 93 and 94 and a corresponding adjustment of the guide blocks to which said rods are connected. This device has an advantage in that it insures the blocks being securely held in the adjusted positions.

There may be other modifications without departure from the invention.

I claim:

1. In an hydraulic transmission, the combination with a pump, of a fluid motor comprising a plurality of units, one or more pistons operating in each of said units, means for maintaining the pistons of one of said units on a predetermined fixed stroke, means for operatively connecting said units to the pump for joint actuation, and means for varying the stroke of the pistons of another of said units to thereby regulate the speeds and torques delivered by said motor.

2. In an hydraulic transmission, the combination with a pump, of a fluid motor comprising a plurality of units, means for maintaining a predetermined displacement in one of said units, means for varying the displacement of another of said units, and means for operatively connecting both of said units with the pump, said variable unit providing for regulation of the speed and torque outputs of said motor.

3. In an hydraulic transmission, the combination with a pump, of a fluid motor comprising a plurality of units operatively connected with said pump, one or more pistons operating in each of said units, means for maintaining the pistons of one of said units on a predetermined fixed stroke whereby said motor will operate at one rate of speed, and means for varying the strokes of the pistons operating in other of said units to thereby regulate the speed and torque of said motor.

4. In an hydraulic transmission, the combination with pump mechanism comprising a plurality of independent variable-discharge units, said mechanism also including a valve member common to said units and having a plurality of sets of ports therein individual to the respective units, means for adjusting said units whereby the discharge pressure applied to said valve member by certain of said units opposes and substantially balances the discharge pressure applied to the member by the others of said units, a fluid motor mechanism comprising a plurality of units, a valve member common to said motor units and having a plurality of sets of ports associated respectively with said motor units and passages through which the pump units are connected with said motor units, and adjustable means for varying certain of said motor units, said motor unit adjusting means being such that the pressures applied to said motor units through the valve ports substantially balance with respect to said valve member.

5. In an hydraulic transmission, the combination with a pump mechanism comprising a rotary cylinder body, two series of pistons operative in said body and constituting independent pump units, a valve member in the interior of said body comprising two sets of ports respectively connected to the cylinders of said units, an adjustable guide ring connected to each of said series of pistons, means for adjusting said guide rings in opposite directions to positions of eccentricity with respect to said cylinder body to thereby vary the rate of discharge of said units, said guide rings being so relatively arranged with respect to said cylinder body that fluid pressure is applied to ports at opposite sides of said valve member, a fluid motor mechanism comprising a rotary cylinder body, two series of pistons operative in said body and representing independent motor units, a guide ring associated with each of said last mentioned series of pistons, one of said last mentioned guide rings being fixed to afford the associated pistons a predetermined stroke and the other of said guide rings being adjustable from a concentric position to positions of eccentricity with respect to said cylinder body to thereby vary the stroke of the other of said motor units, and means for connecting the ports of said pump units with corresponding ports of the motor units, the guide rings of the motor units being so relatively positioned with respect to the cylinder body that the pressure from the pump is applied to the valve ports of the respective motor units at opposite sides of the valve member.

6. In an hydraulic transmission, the combination with a pump mechanism comprising a rotary cylinder body, pistons operative in said cylinder body, a valve member in the interior of said body comprising ports adapted to register with the cylinders of said cylinder body, an adjustable guide ring connected with said pistons for varying the strokes thereof, a fluid motor mechanism comprising a rotary cylinder body, a plurality of series of pistons operative in said body, a cylindrical valve member in the interior of said cylinder body having a plurality of sets of ports, one of said sets of ports being adapted to register with the cylinders of each of said series, a guide ring associated with each of said last mentioned series of pistons, and adjustable to positions concentric and eccentric with respect to said valve member to adjust the strokes of said pistons, means for actuating certain of said rings in opposite directions with respect to the concentric position and means for connecting the ports of said pump with the ports of said motor units.

7. In an hydraulic transmission, the combination with a pump mechanism comprising a rotary cylinder body, a plurality of series of pistons operative in said body and constituting independent pump units, a valve member in the interior of said cylinder body comprising a plurality of sets of ports, one set of ports being adapted to register with each series of cylinders in said cylinder body, a guide ring connected to each of said series of pistons and adjustable to positions concentric and eccentric with respect to the axis of rotation of said cylinder body for varying the strokes of said pistons, means for adjusting said guide rings in opposite directions with respect to the concentric position whereby the forces exerted upon said central valve are substantially balanced, a fluid motor mechanism comprising a rotary cylinder body, pistons operative in said body, guide means associated with said pistons for varying the strokes thereof, a valve member in the interior of said last mentioned cylinder body comprising ports, said ports being adapted to register with the cylinders of said cylinder body, and means for connecting the ports of said pump units with the ports of said motor.

8. In an hydraulic transmission, the combination with a pump mechanism comprising a plurality of variable discharge units, said mechanism also including a valve member common to said units, and having a plurality of sets of ports therein individual to the respective units, means for adjusting said units to vary the discharge, a fluid motor mechanism comprising a plurality of units, a valve member common to said motor units, and having a plurality of sets of ports associated respectively with said motor units, and passages through which the pump units are connected with said motor units, means for immobilizing one of said motor units in operative position whereby said motor is operated at one rate of speed for a given discharge of said pump and adjustable means for varying other of said motor units to vary the speed and driving torque of said motor mechanism.

9. In an hydraulic transmission, the combination with a pump mechanism, comprising a rotary cylinder body, a plurality of series of pistons operative in said cylinder body and constituting pump units, a cylindrical valve member in the interior of said body comprising sets of ports, one set for each of said pump units, said ports being adapted to register with the cylinders of said pump units, an adjustable guide ring connected to each of said series of pistons, means for adjusting said guide rings to vary the rate of discharge of said pump units, a fluid motor mechanism comprising a rotary cylinder body, a plurality of series of pistons operative in said body, a guide ring associated with the pistons of each of said last mentioned series of pistons and adjustable to positions concentric and eccentric with respect to the axis of rotation of said cylinder body to vary the strokes of said pistons, a valve member common to said motor units having a plurality of sets of ports therein, one set of said ports being adapted to register with the cylinders of each of said motor units, means for holding the guide ring associated with one of said series of pistons in a position eccentric to the axis of rotation of said cylinder body, whereby said motor will be rotated at one rate of speed for a given discharge of said pump, means for actuating the guide rings associated with other of said series of pistons in opposite directions with respect to the concentric position to vary the speed of rotation and the driving torque of said motor, and thereby balancing the forces exerted on said valve, and means for connecting the ports of said pump units with corresponding ports of said motor units.

ALBERT R. KUZELEWSKI.